(12) United States Patent
Kojima

(10) Patent No.: US 11,422,361 B2
(45) Date of Patent: Aug. 23, 2022

(54) OPTICAL SCANNER, THREE-DIMENSIONAL MEASURING APPARATUS, AND ROBOT SYSTEM

(71) Applicant: Seiko Epson Corporation, Tokyo (JP)

(72) Inventor: Hisako Kojima, Kai (JP)

(73) Assignee: SEIKO EPSON CORPORATION, Tokyo (JP)

( * ) Notice: Subject to any disclaimer, the term of this patent is extended or adjusted under 35 U.S.C. 154(b) by 386 days.

(21) Appl. No.: 16/830,471

(22) Filed: Mar. 26, 2020

(65) Prior Publication Data

US 2020/0310107 A1 Oct. 1, 2020

(30) Foreign Application Priority Data

Mar. 27, 2019 (JP) .............................. JP2019-060482

(51) Int. Cl.
| | |
|---|---|
| *G02B 26/10* | (2006.01) |
| *G02B 26/08* | (2006.01) |
| *G01B 11/25* | (2006.01) |
| *B25J 9/16* | (2006.01) |

(52) U.S. Cl.
CPC .......... *G02B 26/085* (2013.01); *B25J 9/1697* (2013.01); *G01B 11/2518* (2013.01); *G02B 26/10* (2013.01)

(58) Field of Classification Search
CPC .............. G01B 11/2518; G01B 5/0014; G02B 7/1815; G02B 26/085; G02B 26/10; B25J 9/1697
See application file for complete search history.

(56) References Cited

U.S. PATENT DOCUMENTS

| | | | | |
|---|---|---|---|---|
| 2001/0019444 A1* | 9/2001 | Takada | ................. | G02B 26/125 359/207.1 |
| 2012/0257268 A1* | 10/2012 | Hino | .................... | G02B 26/085 310/38 |
| 2013/0286151 A1* | 10/2013 | Wakabayashi | ......... | G03B 21/28 310/38 |
| 2021/0132403 A1* | 5/2021 | Filhaber | ............... | G02B 5/0252 |

FOREIGN PATENT DOCUMENTS

| | | |
|---|---|---|
| JP | 2009-69676 A | 4/2009 |
| JP | 2014-198365 A | 10/2014 |

* cited by examiner

*Primary Examiner* — Tsion B Owens
(74) *Attorney, Agent, or Firm* — Yu Gang

(57) ABSTRACT

There is provided an optical scanner including: a mirror having a reflection surface for reflecting light, and a first back surface positioned at a side opposite to the reflection surface; a permanent magnet disposed at the first back surface of the mirror; a support portion that supports the mirror and has a second back surface positioned at the same side as the first back surface; a shaft portion that couples the mirror and the support portion to each other and enables the mirror to swing around a swing axis; a first member disposed at the second back surface of the support portion; a second member that supports the first member in a cantilever manner in a direction orthogonal to the swing axis and along the second back surface; a third member disposed to face the first member via the second member and coupled to the second member; and an electromagnetic coil disposed between the first member and the third member.

14 Claims, 9 Drawing Sheets

OPTICAL SCANNER, THREE-DIMENSIONAL MEASURING APPARATUS, AND ROBOT SYSTEM

The present application is based on, and claims priority from JP Application Serial Number 2019-060482, filed Mar. 27, 2019, the disclosure of which is hereby incorporated by reference herein in its entirety.

BACKGROUND

1. Technical Field

The present disclosure relates to an optical scanner, a three-dimensional measuring apparatus, and a robot system.

2. Related Art

JP-A-2009-69676 discloses an optical scanning device that deflects incident light and performs optical scanning. The optical scanning device described in JP-A-2009-69676 includes a rectangular plate-like mirror member on which a mirror surface is formed, a frame member that supports the mirror member via a pair of torsion bars, and a permanent magnet adhered to a surface opposite to a mirror surface of the mirror member. In addition, it is disclosed that the frame member is in a state of being sandwiched between an upper cover and a lower cover, and the mirror member and the permanent magnet are sealed in an accommodation space. Furthermore, the optical scanning device has an electromagnet including a yoke provided near the permanent magnet and a coil wound around the yoke. Further, it is disclosed that the mirror member is reciprocated with the torsion bar as a torsion rotation axis by an interaction between a magnetic field generated in the vicinity of a gap of the yoke and the permanent magnet. In addition, since there is a lower cover between the electromagnet and the permanent magnet and it is difficult to reduce the gap between the electromagnet and the permanent magnet, it is necessary to increase the Lorentz force that acts on the permanent magnet, and to increase a current that flows through the electromagnet.

However, in the optical scanning device described in JP-A-2009-69676, when the current that flows through the electromagnet increases, an amount of heat generated by the electromagnet increases, a thermal stress is generated in the frame member, and deformation of the frame member is caused. As a result, there arises a problem that the accuracy of the light deflection direction by the mirror surface decreases.

SUMMARY

An optical scanner according to an aspect of the present disclosure includes: a mirror having a reflection surface for reflecting light, and a first back surface positioned at a side opposite to the reflection surface; a permanent magnet disposed at the first back surface of the mirror; a support portion that supports the mirror and has a second back surface positioned at the same side as the first back surface; a shaft portion that couples the mirror and the support portion to each other and enables the mirror to swing around a swing axis; a first member disposed at the second back surface of the support portion; a second member that supports the first member in a cantilever manner in a direction orthogonal to the swing axis and along the second back surface; a third member disposed to face the first member via the second member and coupled to the second member; and an electromagnetic coil disposed between the first member and the third member.

DESCRIPTION OF EXEMPLARY EMBODIMENTS

Hereinafter, an optical scanner, a three-dimensional measuring apparatus, and a robot system according to the present disclosure will be described in detail based on embodiments illustrated in the attached drawings.

First Embodiment

Figure 1:
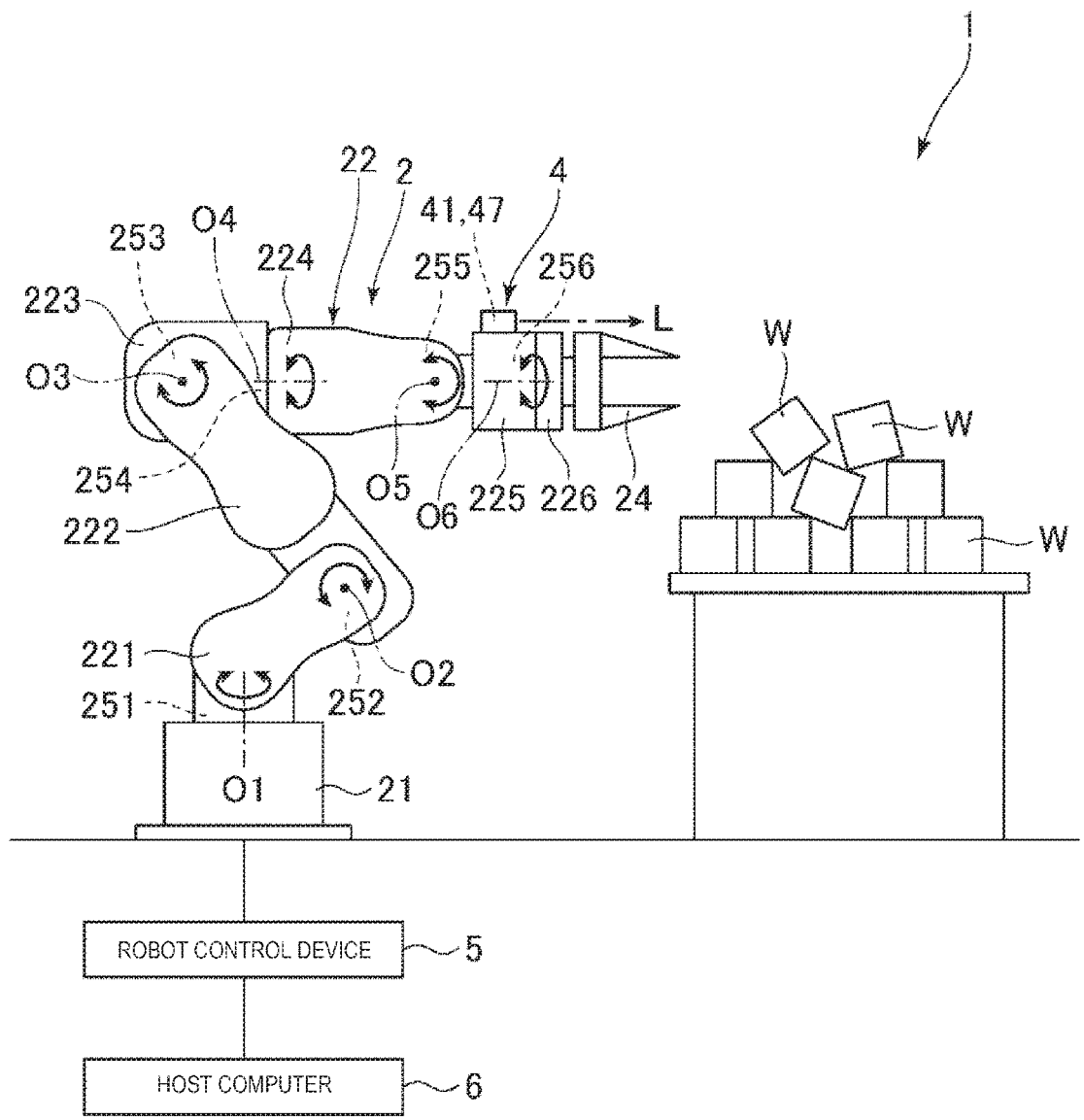
FIG. 1 is a view illustrating an overall configuration of a robot system according to a first embodiment.
Figure 2:
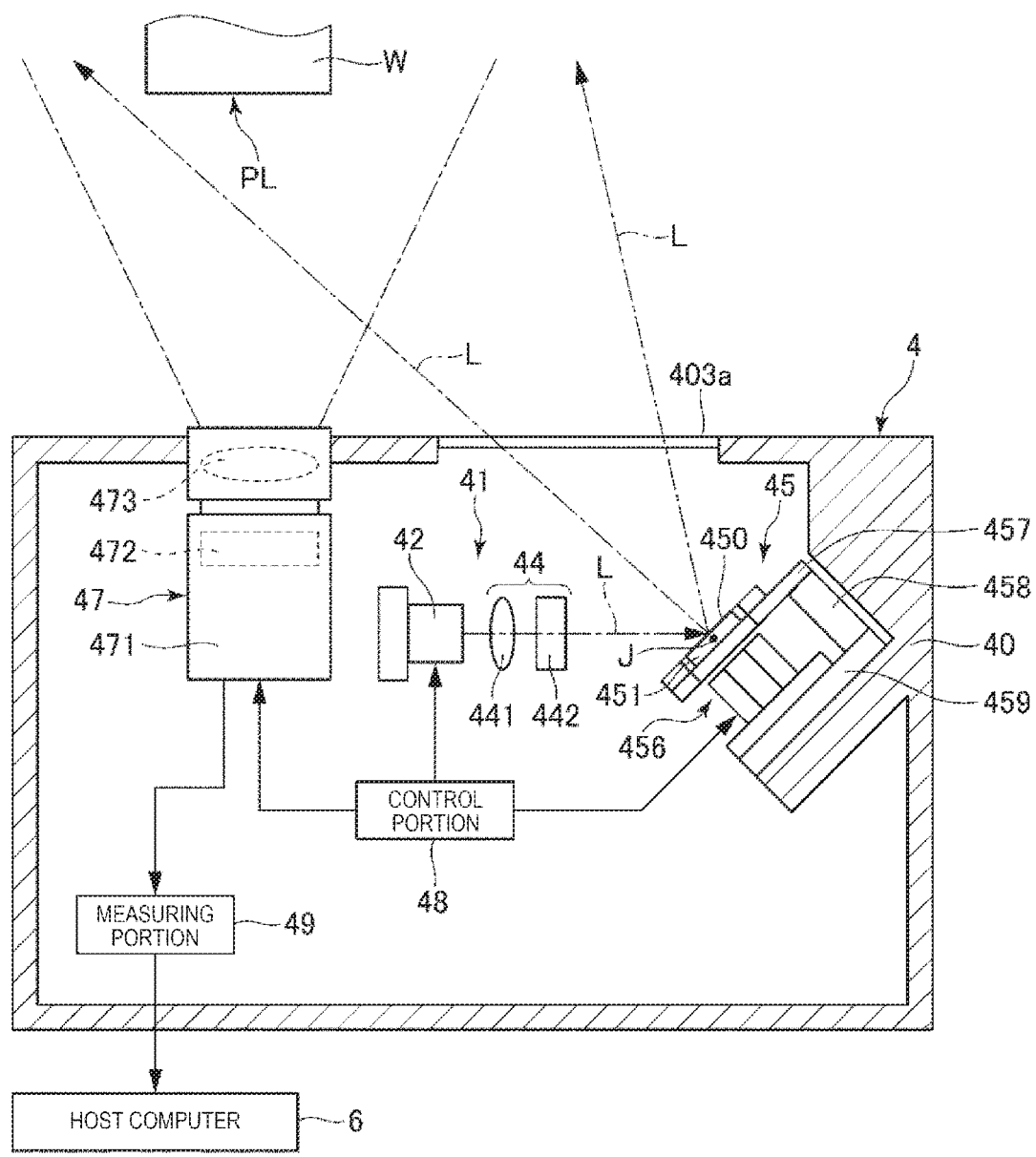
FIG. 2 is a view illustrating an overall configuration of a three-dimensional measuring apparatus provided in the robot system illustrated in FIG. 1.
Figure 3:
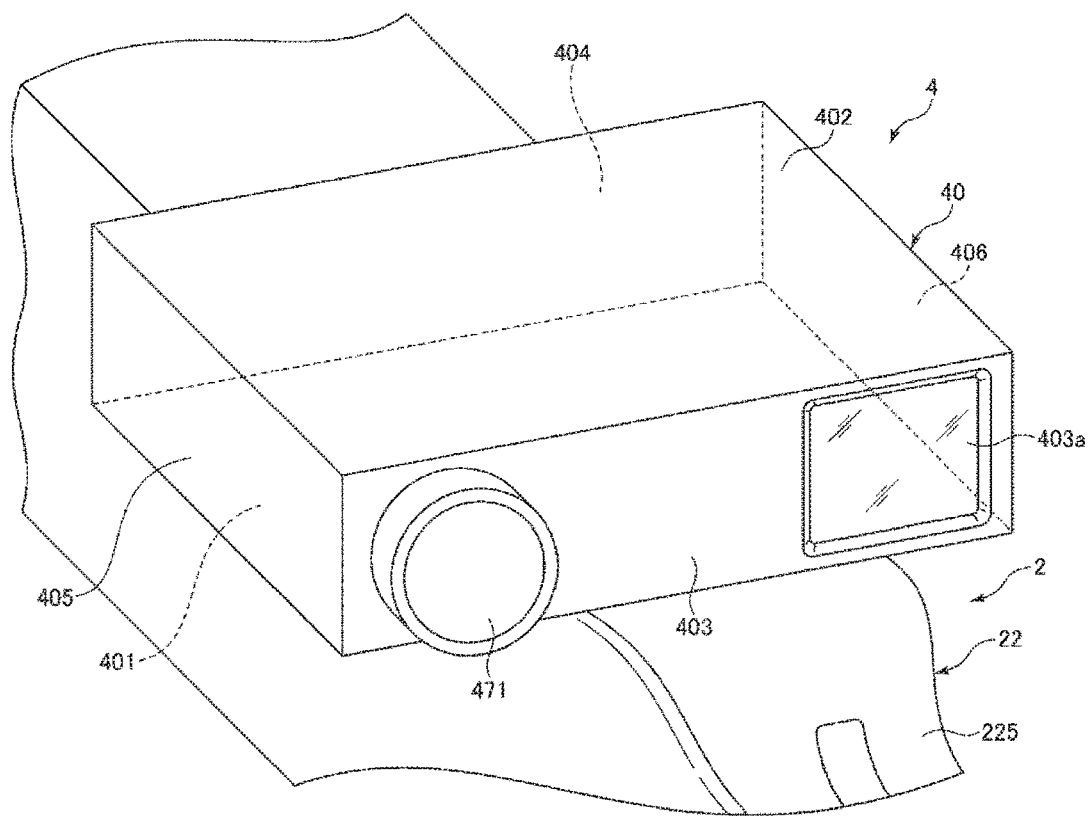
FIG. 3 is a perspective view illustrating the three-dimensional measuring apparatus illustrated in FIG. 2.
Figure 4:
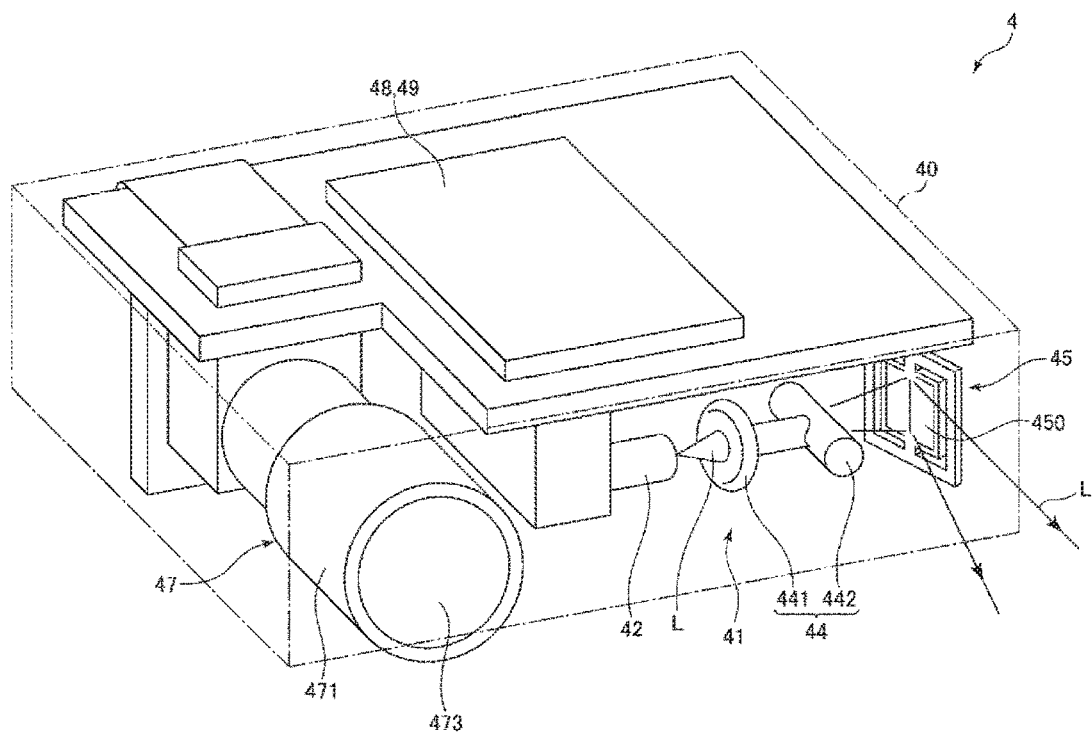
FIG. 4 is a perspective view illustrating the inside of the three-dimensional measuring apparatus illustrated in FIG. 3.
Figure 5:
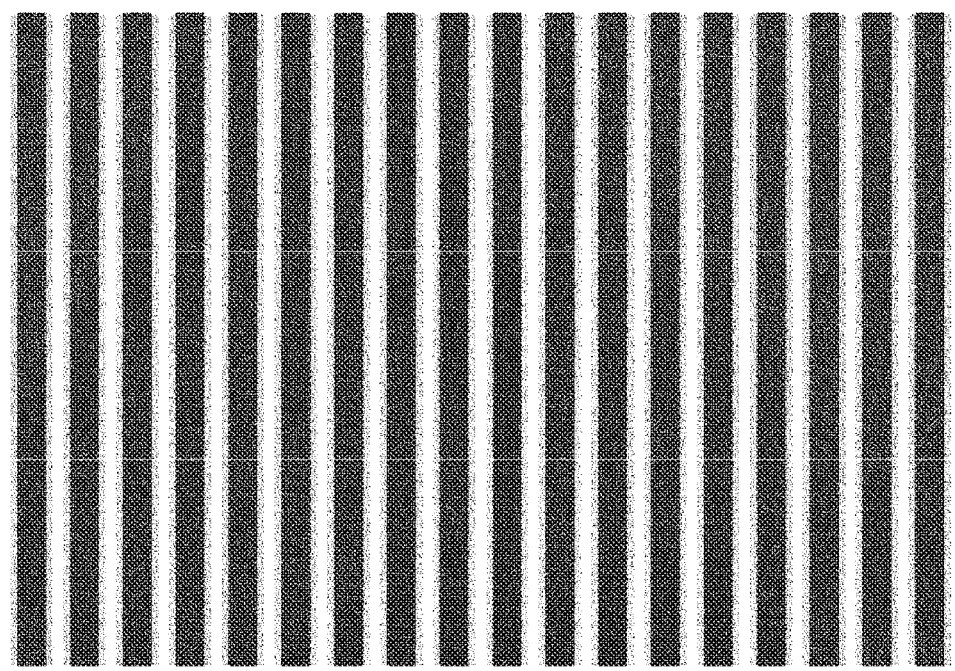
FIG. 5 is a plan view illustrating an example of pattern light projected by a projection portion illustrated in FIG. 4.
Figure 6:
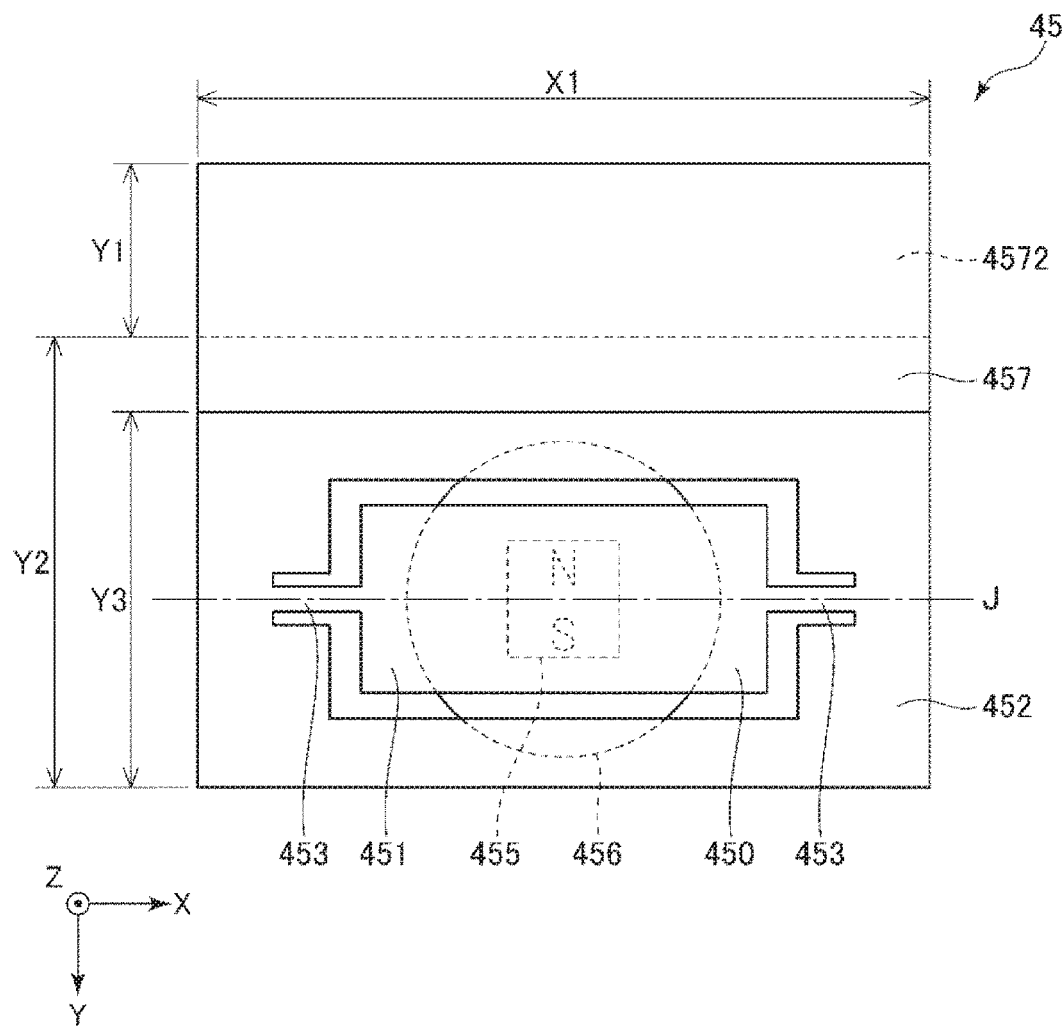
FIG. 6 is a plan view illustrating an optical scanning portion included in the three-dimensional measuring apparatus illustrated in FIG. 4.

FIG. 1 is a view illustrating an overall configuration of the robot system according to a first embodiment. FIG. 2 is a view illustrating an overall configuration of the three-dimensional measuring apparatus provided in the robot system illustrated in FIG. 1. FIG. 3 is a perspective view illustrating the three-dimensional measuring apparatus illustrated in FIG. 2. FIG. 4 is a perspective view illustrating the inside of the three-dimensional measuring apparatus illustrated in FIG. 3. FIG. 5 is a plan view illustrating an example of pattern light projected by a projection portion illustrated in FIG. 4. FIG. 6 is a plan view illustrating an optical scanning portion included in the three-dimensional measuring apparatus illustrated in FIG. 4.

A robot system 1 illustrated in FIG. 1 includes a robot 2, a three-dimensional measuring apparatus 4 that performs three-dimensional measurement of an object W using laser light L, a robot control device 5 that controls driving of the robot 2 based on the measurement result of the three-dimensional measuring apparatus 4, and a host computer 6 that can communicate with the robot control device 5. Each of the members can communicate with each other in a wired or wirelessly manner, and the communication may be performed via a network, such as the Internet.

1. Robot

The robot 2 is a robot that performs work, such as feeding, removing, transporting, and assembling of precision equipment or components that configure the precision equipment. However, the application of the robot 2 is not particularly limited. The robot 2 according to the embodiment is a 6 axis robot, and includes a base 21 fixed to a floor or a ceiling and a robot arm 22 coupled to the base 21 as illustrated in FIG. 1.

The robot arm 22 includes a first arm 221 that is rotatably coupled to the base 21 around a first axis O1, a second arm 222 that is rotatably coupled to the first arm 221 around a second axis O2, a third arm 223 rotatably coupled to the second arm 222 around a third axis O3, a fourth arm 224 rotatably coupled to the third arm 223 around a fourth axis O4, a fifth arm 225 rotatably coupled to the fourth arm 224 around a fifth axis O5, and a sixth arm 226 rotatably coupled to the fifth arm 225 around the sixth axis O6. Further, an end effector 24 that corresponds to the work to be executed by the robot 2 is mounted on the sixth arm 226. In the following, the end effector 24 side of the first arm 221 to the sixth arm 226 is also referred to as "distal end" or "distal end side", and the base 21 side is also referred to as "proximal end" or "proximal end side".

The robot 2 includes a first driving device 251 that rotates the first arm 221 with respect to the base 21, a second driving device 252 that rotates the second arm 222 with respect to the first arm 221, a third driving device 253 that rotates the third arm 223 with respect to the second arm 222, a fourth driving device 254 that rotates the fourth arm 224 with respect to the third arm 223, a fifth driving device 255 that rotates the fifth arm 225 with respect to the fourth arm 224, and a sixth driving device 256 that rotates the sixth arm 226 with respect to the fifth arm 225. Each of the first driving device 251 to the sixth driving device 256 includes, for example, a motor as a driving source, a controller that controls driving of the motor, and an encoder that detects a rotation amount of the motor. Each of the first driving device 251 to the sixth driving device 256 is independently controlled by the robot control device 5.

The robot 2 is not limited to the configuration of the embodiment, and for example, the number of arms of the robot arm 22 may be 1 to 5, or may be 7 or more. Further, for example, the type of the robot 2 may be a SCARA robot or a double-arm robot having two robot arms 22.

2. Robot Control Device

The robot control device 5 receives a position command of the robot 2 from the host computer 6 and independently controls the driving of each of the first driving device 251 to the sixth driving device 256 so as to be at a position that corresponds to the position command received by the first arm 221 to the sixth arm 226. The robot control device 5 includes, for example, a computer, and includes a processor (CPU) that processes information, a memory coupled to be capable of communicating with the processor, and an external interface. Various programs that can be executed by the processor are stored in the memory, and the processor can read and execute various programs and the like stored in the memory.

3. Three-Dimensional Measuring Apparatus

Next, the three-dimensional measuring apparatus 4 according to the first embodiment will be described.

The three-dimensional measuring apparatus 4 performs three-dimensional measurement of the object W using a phase shift method. As illustrated in FIG. 2, the three-dimensional measuring apparatus 4 includes a projection portion 41 that projects pattern light PL for three-dimensional measurement using the laser light L onto a region including the object W, an imaging portion 47 that acquires image data obtained by capturing an image of the region including the object W onto which the pattern light PL is projected, a control portion 48 that controls driving of the projection portion 41 and the imaging portion 47, a measuring portion 49 that measures a three-dimensional shape of the object W based on the image data, and a housing 40 that accommodates these members.

In the embodiment, as illustrated in FIG. 3, the housing 40 is fixed to the fifth arm 225 of the robot 2. The housing 40 has a box shape, and includes a bottom surface 401 fixed to the fifth arm 225, a top surface 402 that faces the bottom surface 401, a front surface 403 positioned at the distal end side of the fifth arm 225, a back surface 404 positioned at the proximal end side of the fifth arm 225, and a pair of side surfaces 405 and 406. As illustrated in FIG. 4, the projection portion 41, the imaging portion 47, the control portion 48, and the measuring portion 49 are housed in the housing 40. However, the shape of the housing 40 is not particularly limited.

Moreover, a configuration material of the housing 40 is not particularly limited, and for example, various resins, various metals, and various ceramics can be used. However, from the viewpoint of heat dissipation, it is preferable to use a material having excellent thermal conductivity, such as aluminum or stainless steel. Further, the bottom surface 401 of the housing 40 may be configured to be fixed to the fifth arm 225 of the robot 2 via a joint portion (not illustrated).

The projection portion 41 is disposed in the housing 40 so as to irradiate the distal end side of the fifth arm 225 with the laser light L, and the imaging portion 47 faces the distal end side of the fifth arm 225 and is disposed in the housing 40 such that the image of the region including an irradiation range of the laser light L is captured. As illustrated in FIG. 3, a window portion 403a through which the laser light L is emitted is provided on the front surface 403 of the housing 40.

The arrangement of the three-dimensional measuring apparatus 4 is not particularly limited, and may be any of the first arm 221 to the fourth arm 224 or the sixth arm 226. Further, the projection portion 41 and the imaging portion 47 may be fixed to different arms. Moreover, the control portion 48 and the measuring portion 49 may be disposed outside the housing 40, and for example, may be included in the robot control device 5 or the host computer 6.

The projection portion 41 has a function of projecting the pattern light PL as illustrated in FIG. 5 onto the object W by irradiating the object W with the laser light L. As illustrated in FIGS. 2 and 4, the projection portion 41 has a laser light source 42 that emits the laser light L, an optical system 44 that includes a plurality of lenses through which the laser light L passes, and an optical scanning portion 45 (optical scanner) that scans the laser light L that has passed through the optical system 44 toward the object W. The laser light source 42 is not particularly limited, and for example, a semiconductor laser, such as a vertical cavity surface emitting laser (VCSEL) or an external cavity type vertical surface emitting laser (VECSEL), can be used.

The optical system 44 includes a condenser lens 441 that condenses the laser light L emitted from the laser light source 42 in the vicinity of the object W, and a rod lens 442 that forms the laser light L condensed by the condenser lens 441 into a line shape that extends in a direction parallel to a swing axis J (will be described later), that is, a depth direction of a paper surface in FIG. 2.

The optical scanning portion 45 has a function of scanning the laser light L that has been formed into a line shape by the rod lens 442. The optical scanning portion 45 is not particularly limited, and for example, a micro electro mechanical systems (MEMS), a galvanometer mirror, a polygon mirror, or the like can be used.

The optical scanning portion 45 according to the embodiment is configured with MEMS. As illustrated in FIG. 6, the optical scanning portion 45 includes a mirror 451 having a reflection surface 450, a permanent magnet 455 disposed on the mirror 451, a support portion 452 that supports the mirror 451, a shaft portion 453 that couples the mirror 451 and the support portion 452 to each other, a first member 457 disposed in the support portion 452, a second member 458 coupled to the first member 457, a third member 459 coupled to the second member 458, and an electromagnetic coil 456 disposed to be oriented toward the permanent magnet 455.

In FIG. 6, among the directions in which the normal line of the reflection surface 450 in a stationary state extends, a near side of the paper surface is a +Z axis direction and a far side of the paper surface is a −Z axis direction. The direction in which the shaft portion 453 extends is an X axis direction orthogonal to the Z axis direction. Furthermore, a direction orthogonal to both the Z axis direction and the X axis direction is a Y axis direction.

In the optical scanning portion 45, the swing axis J matches an extending direction of the line-shaped laser light L, that is, a widening direction of the laser light L widened by the rod lens 442. In addition, when a drive signal is applied to the electromagnetic coil 456, the mirror 451 swings forward and backward alternately around the swing axis J at a predetermined cycle, and accordingly, the line-shaped laser light L is scanned in a planar shape. The optical scanning portion 45 will be described later in detail.

Although the projection portion 41 has been described above, the configuration thereof is not particularly limited as long as the predetermined pattern light PL can be projected onto the object W. For example, in the embodiment, the laser light L is diffused in a line shape by the optical system 44, but the present disclosure is not limited thereto, and the laser light may be diffused in a line shape using, for example, a MEMS or a galvanometer mirror. In other words, the laser light L may be two-dimensionally scanned using the two optical scanning portions 45. Further, for example, the laser light L may be two-dimensionally scanned using a gimbal type MEMS having a degree of freedom with two axes.

The imaging portion 47 captures an image of a state where the pattern light PL is projected onto at least one object W. As illustrated in FIG. 2, the imaging portion 47 includes a camera 471 including an imaging element 472, such as a CMOS image sensor or a CCD image sensor, and a condenser lens 473, for example. The camera 471 is coupled to the measuring portion 49 and transmits the image data to the measuring portion 49.

The control portion 48 controls the driving of the optical scanning portion 45 by applying the drive signal to the electromagnetic coil 456, and controls the driving of the laser light source 42 by applying the drive signal to the laser light source 42. The control portion 48 emits the laser light L from the laser light source 42 in synchronization with the swinging of the mirror 451, and for example, as illustrated in FIG. 5, the pattern light PL having a stripped pattern expressed by brightness of a luminance value is projected onto the object W. However, the pattern light PL is not particularly limited as long as the pattern light PL can be used for the phase shift method as will be described later. In addition, the control portion 48 controls driving of the camera 471 and captures an image of a region including the object W at a predetermined timing.

For example, the control portion 48 projects the pattern light PL onto the object W four times with the phase shifted by $\pi/2$, and each time the pattern light PL is projected onto the object W, the image of the object W onto which the pattern light PL is projected is captured by the imaging portion 47. However, the number of times of projection of the pattern light PL is not particularly limited as long as the phase can be calculated from the imaging result. Further, phase coupling may be performed by performing similar projection and image capturing using a pattern with a large pitch or a pattern with a small pitch. As the number of types of pitches increases, the measurement range and resolution can be improved, but as the number of times of image capturing increases, the time required to acquire the image data increases, and the operating efficiency of the robot 2 decreases. Therefore, the number of times of projection of the pattern light PL may be appropriately set in consideration of the accuracy and measurement range of the three-dimensional measurement and the operation efficiency of the robot 2.

The measuring portion 49 performs the three-dimensional measurement of the object W based on the plurality of pieces of image data acquired by the imaging portion 47. Specifically, three-dimensional information including the posture of the object W, spatial coordinates, and the like is calculated. In addition, the measuring portion 49 transmits the calculated three-dimensional information of the object W to the host computer 6.

The control portion 48 and the measuring portion 49 are configured with, for example, a computer, and include a processor (CPU) that processes information, a memory coupled to be capable of communicating with the processor, and an external interface. Various programs that can be executed by the processor are stored in the memory, and the processor can read and execute various programs and the like stored in the memory.

4. Host Computer

The host computer 6 generates a position command for the robot 2 from the three-dimensional information of the object W calculated by the measuring portion 49 and transmits the generated position command to the robot control device 5. The robot control device 5 independently drives each of the first driving device 251 to the sixth driving device 256 based on the position command received from the host computer 6, and moves the first arm 221 to the sixth arm 226 to the designated position. In the embodiment, the host computer 6 and the measuring portion 49 are separated from each other, but the disclosure is not limited thereto, and the host computer 6 may be equipped with a function as the measuring portion 49.

5. Optical Scanning Portion (Optical Scanner)

Next, the optical scanning portion 45 that is an optical scanner according to the first embodiment will be described.

Figure 7:
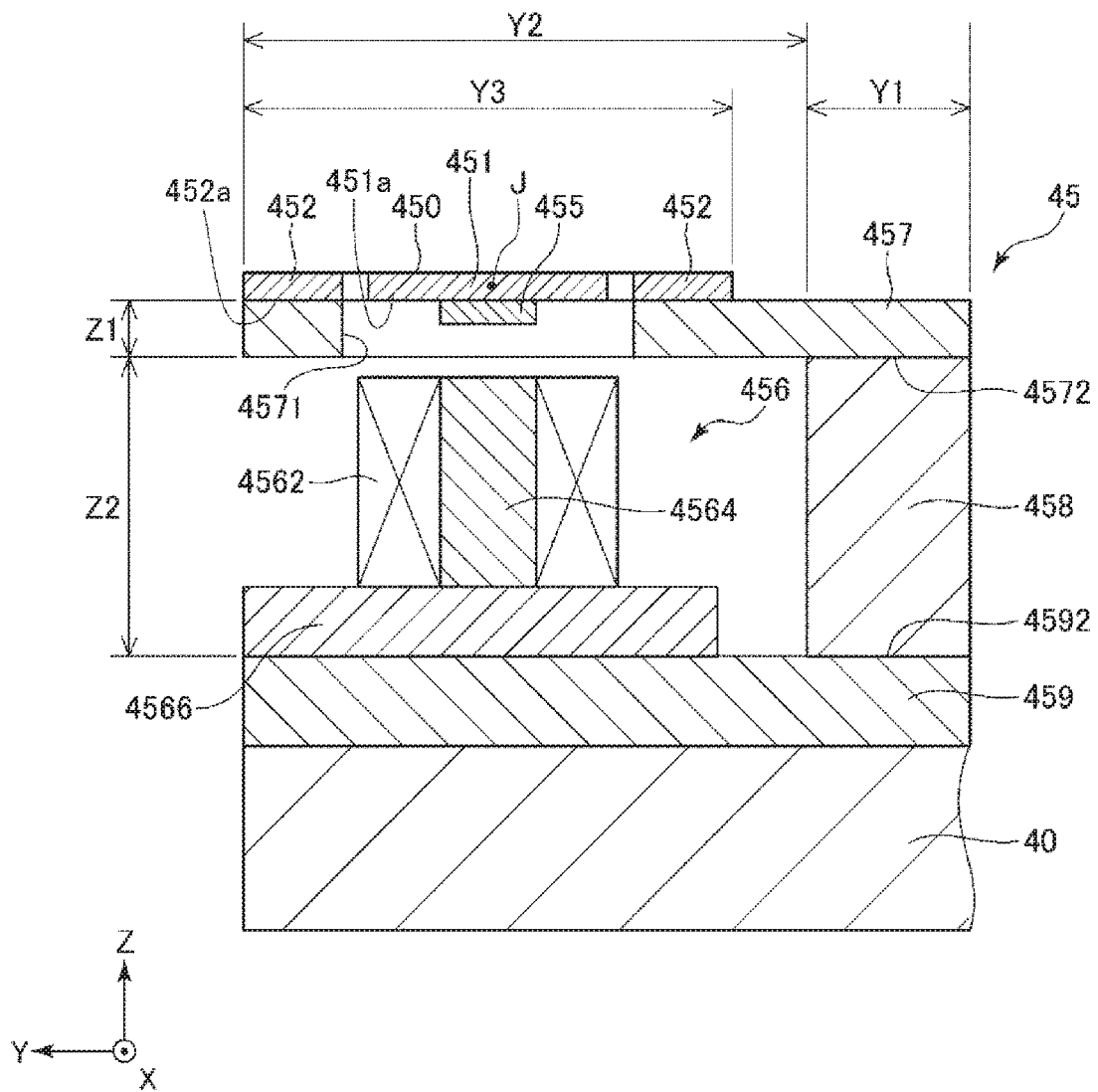
FIG. 7 is a sectional view of the optical scanning portion illustrated in FIG. 6.
Figure 8:
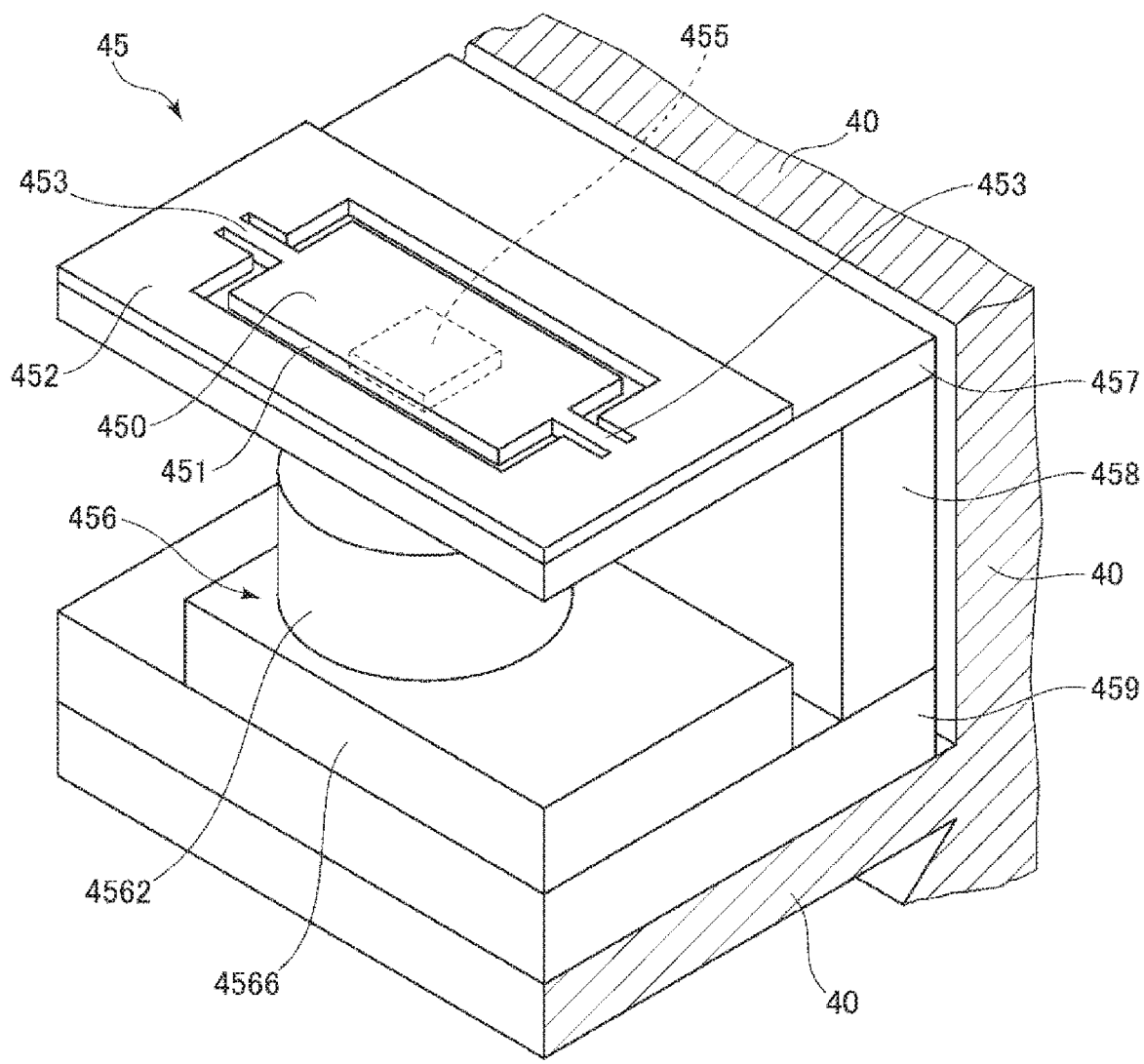
FIG. 8 is a perspective view of the optical scanning portion illustrated in FIG. 7.

FIG. 7 is a sectional view of the optical scanning portion illustrated in FIG. 6. FIG. 8 is a perspective view of the optical scanning portion illustrated in FIG. 7.

As described above, the optical scanning portion 45 illustrated in FIGS. 7 and 8 includes the mirror 451, the support portion 452, the shaft portion 453, the permanent magnet 455, the electromagnetic coil 456, the first member 457, the second member 458, and the third member 459. Hereinafter, each member will be described.

The mirror 451 includes a reflection surface 450 for reflecting light, and a back surface 451a (first back surface) positioned at the side opposite to the reflection surface 450. The reflection surface 450 reflects the laser light L. In addition, a reflective film (not illustrated) is formed on the reflection surface 450. As the reflective film, for example, a metal film, such as aluminum, is used.

A permanent magnet 455 adheres and is disposed on the back surface 451a and swings together with the mirror 451. The permanent magnet 455 is magnetized in the Y axis direction orthogonal to the swing axis J. Examples of the permanent magnet 455 include a neodymium magnet, a ferrite magnet, a samarium cobalt magnet, an alnico magnet, or a bonded magnet.

The shaft portion 453 couples the mirror 451 and the support portion 452 to each other, and supports the mirror 451 so as to be swingable around the swing axis J. The optical scanning portion 45 has two shaft portions 453 and 453 that extend in the X axis direction, and is disposed at the opposite sides of the mirror 451 so as to support the mirror 451 from both sides in the X axis direction. The shaft portions 453 and 453 are torsionally deformed as the mirror 451 swings around the swing axis J. In addition, the shapes of the shaft portions 453 and 453 are not limited to the illustrated shapes as long as the mirror 451 can be supported so as to be swingable around the swing axis J. For example, each of the shaft portions 453 and 453 may be configured with a plurality of beams, and a bent or curved part, a branched part, a part having a different width, or the like may be provided in at least one place in the middle of the extending direction.

As illustrated in FIG. 6, the support portion 452 has a frame shape in plan view from the Z axis direction, and is disposed so as to surround the mirror 451. In addition, the support portion 452 is supporting the mirror 451 through the two axial portions 453 and 453 so as to be swingable. The shape of the support portion 452 is not particularly limited as long as the shape can support the mirror 451, and for example, the support portion 452 may be divided into a part that supports one shaft portion 453 and a part that supports the other shaft portion 453.

A first member 457 adheres and is disposed on the back surface 452a (second back surface) of the support portion 452. The first member 457 has a function as a reinforcing portion that reinforces the mechanical strength of the support portion 452. The first member 457 has a plate shape that widens along an XY plane. In addition, the first member 457 also has a frame shape in plan view from the Z axis direction, and has an opening portion 4571 through which a region that corresponds to the mirror 451 passes as illustrated in FIG. 7. The opening portion 4571 ensures a space for disposing the permanent magnet 455 and a space for the mirror 451 to swing.

Furthermore, the first member 457 extends longer in the −Y axis direction than the support portion 452. An end portion in the −Y axis direction is coupled to the second member 458. Specifically, among the surfaces in the −Z axis direction of the first member 457, the end portion in the −Y axis direction is a support surface 4572 supported by the second member 458.

The second member 458 has a shape having a long axis in the Z axis direction. An end surface in the +Z axis direction of the second member 458 is coupled to the first member 457, and an end surface in the −Z axis direction is coupled to the third member 459. Therefore, the second member 458 is interposed between the first member 457 and the third member 459. Accordingly, a space equal to the length of the major axis of the second member 458 is formed between the first member 457 and the third member 459.

The third member 459 has a plate shape that widens along the XY plane. An end portion in the −Y axis direction is coupled to the second member 458. Specifically, among the surfaces in the +Z axis direction of the third member 459, the end portion in the −Y axis direction is a support surface 4592 supported by the second member 458.

The electromagnetic coil 456 is disposed between the first member 457 and the third member 459. The electromagnetic coil 456 generates the Lorentz force by energizing an alternating current in a static magnetic field generated by the permanent magnet 455, and swings the mirror 451 on which the permanent magnet 455 is disposed. According to such an electromagnetic driving method, a large driving force can be generated, and thus, a swing angle of the mirror 451 can increase while reducing a driving voltage.

In the optical scanning portion 45 as described above, the second member 458 supports the first member 457 in a cantilever manner. For example, as illustrated in FIG. 7, the support in a cantilever manner means a structure in which the end portion of the first member 457 in the +Y axis direction is not supported and is a so-called free end, while the end portion in the −Y axis direction is supported by the second member 458. According to such a cantilever support structure, for example, even when the temperature of the first member 457 or the second member 458 increases and a thermal stress is generated, and warpage is generated in the first member 457, the influence of the warpage can be corrected.

Figure 9:
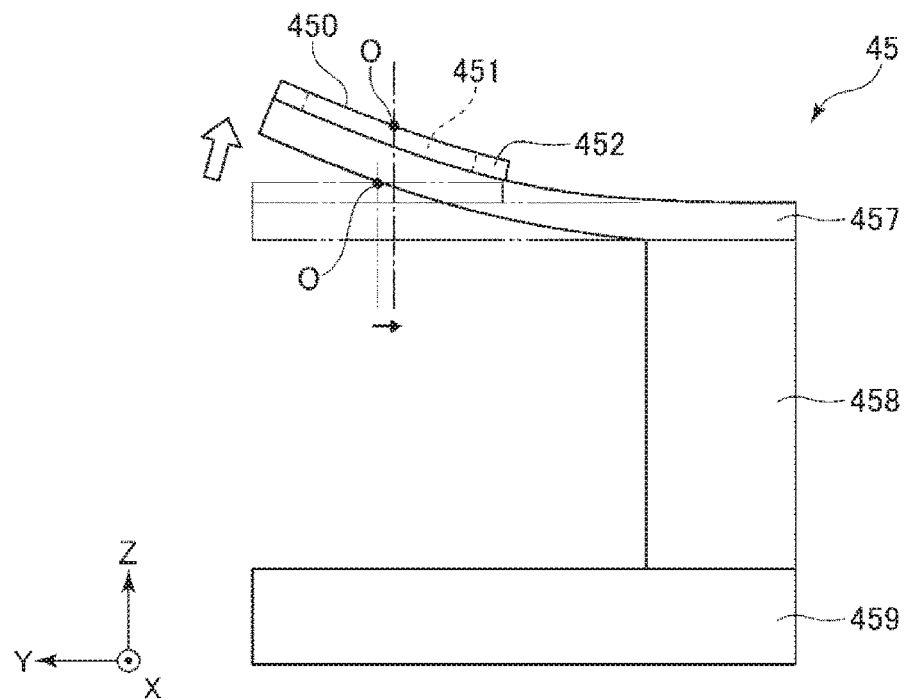
FIG. 9 is a view illustrating a state where a temperature of the optical scanning portion illustrated in FIG. 7 increases and a thermal stress is generated to cause a warpage in the first member.
Figure 10:
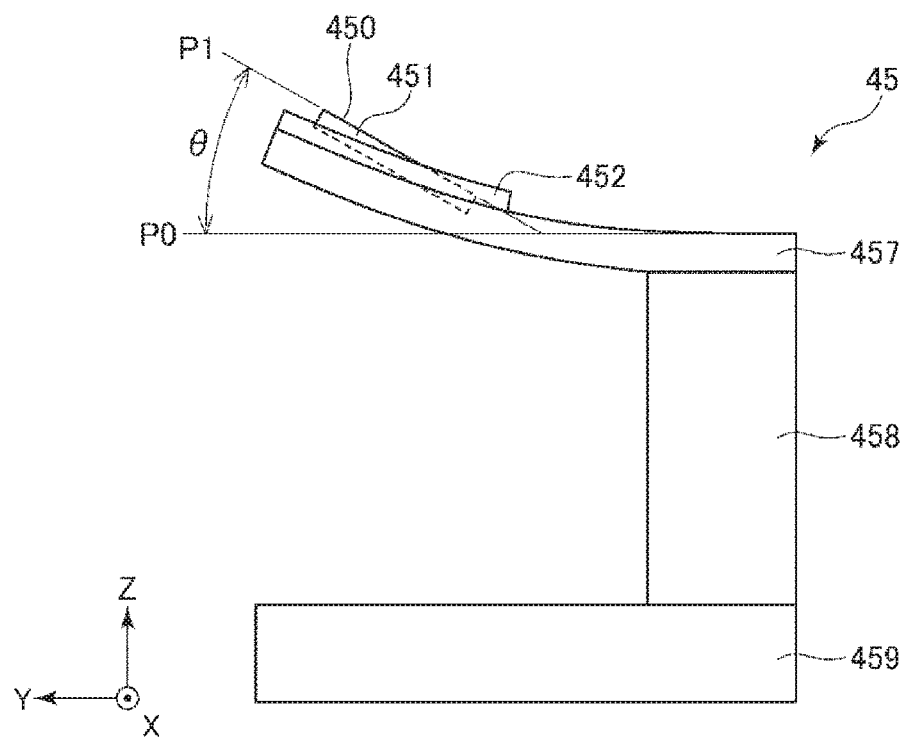
FIG. 10 is a view illustrating a state where a temperature of the optical scanning portion illustrated in FIG. 7 increases and a thermal stress is generated to cause a warpage in the first member.

Specifically, FIGS. 9 and 10 are views illustrating a state where the temperature of the optical scanning portion 45 illustrated in FIG. 7 increases and a thermal stress is generated to cause a warpage of the first member 457. In addition, FIGS. 9 and 10 are simplified for convenience of the description.

When the temperature of the optical scanning portion 45 increases, a thermal stress is generated in the vicinity of the boundaries of the first member 457, the second member 458, and the third member 459. The thermal stress is easily manifested as a warpage of the first member 457. In addition, as illustrated in FIG. 9, a warpage by which the end portion of the first member 457 where the mirror 451 is disposed is displaced in the +Z axis direction is generated. Then, the center O of the reflection surface 450 moves in the −Y axis direction with the generation of warpage.

In addition, the warpage also causes a problem that the reflection surface 450 is unintentionally inclined compared to a case where no warpage is generated. Specifically, a plane including the reflection surface 450 when the mirror 451 does not swing in a state where no warpage is generated is defined as a reference plane P0. When the warpage is generated, torsional deformation is generated in the shaft portions 453 and 453, and the reflection surface 450 is unintentionally inclined with respect to the reference plane P0. Accordingly, as illustrated in FIG. 10, a plane P1 including the reflection surface 450 in a state where the warpage is generated has an inclination of an angle θ with respect to the reference plane P0.

The movement of the center O of the reflection surface 450 and the generation of the inclination of the reflection surface 450 as described above cause the center of the striped pattern light PL projected onto the above-described object W to be shifted from the intended position. As a result, there arises a problem that the accuracy of the three-dimensional measurement decreases.

Here, in the embodiment, as described above, the second member 458 supports the first member 457 in a cantilever manner. Then, a support direction of supporting in a cantilever manner, that is, a direction of coupling the unsupported end portion of the first member 457 and the end portion supported by the second member 458, is set to be a direction of intersecting the swing axis J. An intersection angle may be less than 90°, but in the embodiment, in particular, the support direction is parallel to the Y axis direction, and the swing axis J is parallel to the X axis direction. Therefore, the support direction and the swing axis J intersect each other at 90°.

According to the cantilever support structure, even when a warpage illustrated in FIGS. 9 and 10 is generated in the first member 457 and the center of the pattern light PL is shifted accompanying the warpage, the shifting direction can be made to match the scanning direction of the pattern light PL accompanying the swing of the mirror 451. Accordingly, even when the center of the pattern light PL is shifted, the shift can be corrected by adjusting the swing angle of the mirror 451. As a result, the center of the pattern light PL can be returned to the intended position, and it is possible to suppress a decrease in the accuracy of the three-dimensional measurement.

Specifically, when the pattern light PL is projected while being scanned, in general, an alternating current is applied to the electromagnetic coil 456, and the mirror 451 is swung at a constant cycle. Accordingly, the pattern light PL is reciprocally scanned with a constant amplitude, and a striped pattern is drawn. In addition, in a case of correcting the position of the center of the pattern light PL, a direct current is superimposed on the alternating current. By superimposing the direct current, an operation of shifting a median value of the swing angle width of the mirror 451 in accordance with the voltage value of the direct current, that is, a so-called DC offset operation can be executed. As a result, the center position of the drawing by the pattern light PL can be corrected, and deterioration of the accuracy of three-dimensional measurement can be suppressed.

As described above, the optical scanning portion 45 that is the optical scanner according to the present embodiment includes: the reflection surface 450 that reflects light; the mirror 451 including the back surface 451a (first back surface) positioned at the side opposite to the reflection surface 450; the permanent magnet 455 disposed on the back surface 451a of the mirror 451; the support portion 452 that supports the mirror 451 and has the back surface 452a (second back surface) positioned at the same side as the back surface 451a (first back surface); the shaft portions 453 and 453 that couple the mirror 451 and the support portion 452 to each other and enable the mirror 451 to swing around the swing axis J; the first member 457 disposed on the back surface 452a (second back surface) of the support portion 452; the second member 458 that supports the first member 457 in a cantilever manner in the direction orthogonal to the swing axis J and along the back surface 452a (second back surface); the third member 459 that is disposed to face the first member 457 via the second member 458 and coupled to the second member 458; and the electromagnetic coil 456 disposed between the first member 457 and the third member 459.

In the optical scanning portion 45, the second member 458 supports the first member 457 in a cantilever manner, and the support direction intersects the swing axis J. Therefore, even when the warpage is generated in the first member 457 due to the generation of a thermal stress, a positional shift in the drawing of the pattern light PL due to the warpage can be corrected by adjusting the swing angle of the mirror 451. Therefore, according to the optical scanning portion 45 according to the embodiment, even when a temperature change occurs in the optical scanning portion 45, it is possible to realize the optical scanning portion 45 with high accuracy of the light scanning position by the reflection surface 450.

In addition, there is a certain correlation between the temperature of the optical scanning portion 45 and a positional shift amount of the pattern light PL. Therefore, in the above-described DC offset operation, a voltage value of a DC voltage in a DC offset may be set so as to offset the shift amount estimated from the temperature of the optical scanning portion 45 based on the correlation acquired in advance.

In addition, the optical scanning portion 45 preferably includes a temperature sensor (not illustrated). Accordingly, since the temperature of the optical scanning portion 45 can be detected more accurately, the correction by the DC offset can be performed more accurately. Further, the temperature sensor may be provided at a position which is in contact with the optical scanning portion 45 or may be provided at any position in the housing 40. Moreover, when the influence of environmental temperature is also considered, the temperature sensor may be provided outside the housing 40.

In the present embodiment, when the reflection surface 450 is viewed in plan view from the Z axis direction (vertical direction), the support surface 4572 for supporting the first member 457 by the second member 458 is shifted from the mirror 451 and the shaft portion 453. Furthermore, in the present embodiment, the support surface 4572 is also shifted from the support portion 452.

According to such a structure, the effect by the above-described cantilever support structure becomes more remarkable. In other words, by shifting as described above, it is possible to secure a distance between the support surface 4572 and the mirror 451 where a thermal stress is likely to be generated. Accordingly, even when a thermal stress is generated on the support surface 4572, deformation, such as warpage generated in the first member 457 in the vicinity of the mirror 451 can be suppressed small. In addition, "shifted" described above means that there are no overlapping parts.

In the present embodiment, the support surface 4572 of the first member 457 supported by the second member 458 has a rectangular shape having a long axis parallel to the swing axis J as illustrated in FIG. 6. Therefore, the distance between the support surface 4572 and the swing axis J becomes uniform. As a result, for example, even when the warpage is generated in the first member 457, the positional shift of the drawing of the pattern light PL can be corrected with higher accuracy by adjusting the swing angle of the mirror 451.

In the specification, "parallel" is a concept that allows a shift due to a manufacturing error. A shift amount due to manufacturing error is, for example, approximately ±5°. Similarly, in this specification, "orthogonal" is a concept that allows a shift due to a manufacturing error. The shift amount due to manufacturing error is, for example, approximately ±5°.

In addition, a length X1 of the support surface 4572 in the X axis direction, that is, a length of a long axis, is not particularly limited, but is preferably 5 mm or more and 30 mm or less, and more preferably 7 mm or more and 15 mm or less.

Further, a length Y1 of the support surface 4572 in the Y axis direction is not particularly limited, but is preferably 2 mm or more and 5 mm or less.

Furthermore, when the length in the Y axis direction of a part of the first member 457 that is not supported by the support surface 4572 is Y2 [mm], a ratio of Y2/Y1 is preferably 1.2 or more and 3.0 or less, and is more preferably 1.5 or more and 2.5 or less. By setting the ratio of Y2/Y1 within the above-described range, an area of the mirror 451 provided at the part not supported by the support surface 4572 can also be sufficiently ensured, and a support strength on the support surface 4572 can be ensured.

In addition, a length Y3 of the support portion 452 in the Y axis direction is preferably shorter than the length Y2, and as an example, the length Y3 is preferably 3 mm or more and 10 mm or less.

Meanwhile, a length Z1 of the first member 457 in the Z axis direction, that is, a thickness of the first member 457, is not particularly limited, but the length Z1 is preferably 0.2 mm or more and 2.0 mm or less, and is more preferably 0.3 mm or more and 1.0 mm or less. Accordingly, it is possible to avoid the first member 457 from being failed and causing the permanent magnet 455 and the electromagnetic coil 456 to sufficiently close to each other while suppressing the deformation of the first member 457.

In addition, a length Z2 of the second member 458 in the Z axis direction, that is, a height of the second member 458, is not particularly limited, but the length Z2 is preferably 2.5 mm or more and 8.0 mm or less, and is more preferably 3.0 mm or more and 6.0 mm or less. Accordingly, since a sufficient interval can be ensured between the first member 457 and the third member 459, a sufficiently large electromagnetic coil 456 can be disposed. In addition, since a thermal conduction path in the Z axis direction of the second member 458 can be secured sufficiently long, the heat transmitted to the third member 459 is unlikely to be transmitted to the first member 457. As a result, the first member 457 is more unlikely to deform.

A thermal conductivity of the third member 459 is preferably greater than a thermal conductivity of the second member 458. Accordingly, a thermal resistance between the third member 459 and the electromagnetic coil 456 disposed on the upper surface thereof can be made small. As a result, the heat generated by the electromagnetic coil 456 is likely to be transmitted to the third member 459. Accordingly, the temperature increase of the electromagnetic coil 456 can be suppressed, and the generation of distortion accompanying the temperature increase of the first member 457 or the mirror 451 due to thermal radiation can be suppressed. Meanwhile, since the thermal resistance between the third member 459 and the second member 458 increases, the heat to be transmitted to the third member 459 is unlikely to be transmitted to the second member 458. Accordingly, the temperature increase of the second member 458 can be suppressed, and for example, the generation of the thermal stress can be suppressed at an interface between the second member 458 and the third member 459 or an interface between the second member 458 and the first member 457. As a result, it is possible to suppress occurrence of deformation, such as warpage, in the first member 457.

In addition, a difference between the thermal conductivity of the third member 459 and the thermal conductivity of the second member 458 is preferably 10 W/m·K or more, and more preferably 20 W/m·K or more. The thermal conductivity of the third member 459 is preferably 50 W/m·K or more, and more preferably 100 W/m·K or more.

Meanwhile, a thermal expansion coefficient of the first member 457 is preferably the same as a thermal expansion coefficient of the second member 458. Accordingly, there is almost no difference in thermal expansion due to temperature change between the first member 457 and the second member 458. Therefore, a thermal stress is unlikely to be generated on the support surface 4572, and the deformation of the first member 457 can be suppressed particularly small. In addition, the thermal expansion coefficient of the first member 457 is preferably the same as a thermal expansion coefficient of the support portion 452. Accordingly, there is almost no difference in thermal expansion due to temperature change between the first member 457 and the support portion 452. Therefore, a thermal stress is unlikely to be generated on the back surface 452a of the support portion 452, and the deformation of the support portion 452 can be suppressed particularly small. In addition, the thermal expansion coefficient of the first member 457 is preferably the same as a thermal expansion coefficient of the shaft portion 453. Accordingly, there is almost no difference in thermal expansion due to temperature change between the first member 457 and the shaft portion 453. Therefore, even when the temperature of the atmosphere around the first member 457 and the shaft portion 453 changes, the deformation of the shaft portion 453 can be suppressed particularly small. In addition, the thermal expansion coefficient of the first member 457 is preferably the same as a thermal expansion coefficient of the mirror 451. Accordingly, there is almost no difference in thermal expansion due to temperature change between the first member 457 and the mirror 451. Therefore, even when the temperature of the atmosphere around the first member 457 and the mirror 451, the deformation of the mirror 451 can be suppressed particularly small. In addition, the same thermal expansion coefficient means that a difference in linear expansion coefficient is $1.0 \times 10^{-6}$/K or less.

In addition, as the configuration material of the first member 457 and the configuration material of the second member 458, for example, in addition to a glass material, such as borosilicate glass (for example, Pyrex glass (registered trademark) or Tempax glass (registered trademark)), or quartz glass, silicon, ceramics, metal, and the like can be given. Among these, glass materials are preferably used. Since the glass material has a relatively low thermal conductivity, the temperature increase of the first member 457 or the second member 458 is suppressed. Therefore, the deformation of the first member 457 can be more effectively suppressed. In addition, the borosilicate glass is preferably used when the configuration material of the support portion 452 is a silicon-based material because the silicon and the linear expansion coefficient are close to each other.

Meanwhile, examples of the configuration material of the third member 459 include metal materials, such as aluminum, aluminum alloy, stainless steel, copper, copper alloy, nickel, and nickel alloy. Among these, aluminum or an aluminum alloy is preferably used. Since these members have a relatively high thermal conductivity, heat generated by the electromagnetic coil 456 can be efficiently transmitted.

In addition, the first member 457 and the second member 458 adhere or are joined to each other. Furthermore, the second member 458 and the third member 459 also adhere or are joined to each other. For the adhesion, for example, various adhesives, such as an epoxy adhesive, a silicone adhesive, and an acrylic adhesive, are used. For the joining, for example, direct joining is used.

In addition, the boundary surface between the second member 458 and the third member 459 is not limited to the illustrated position. For example, the boundary surface may be at a position shifted in the +Z axis direction from the boundary surface illustrated in FIG. 7. However, in this case, since the thermal resistance of the second member 458 decreases as the height of the second member 458 decreases, the shape of the third member 459 becomes an L shape in plan view from the X axis direction, and the manufacturing cost increases, the position illustrated in FIG. 7 is preferable.

As a configuration material of the support portion 452, for example, a silicon-based material, such as silicon, silicon oxide, or silicon nitride, is used. Specifically, for example, by patterning a silicon on insulator (SOI) substrate, the support portion 452, shaft portions 453 and 453 coupled thereto, and the mirror 451 can be formed.

Meanwhile, the first member 457 and the support portion 452, and the mirror 451 and the permanent magnet 455 adhere to each other using, for example, the above-described adhesive.

In addition, the three-dimensional measuring apparatus 4 illustrated in FIG. 1 includes the housing 40 that accommodates the projection portion 41, but the third member 459 of the optical scanning portion 45 (optical scanner) is coupled to the housing 40 as illustrated in FIGS. 1 and 8. For example, the third member 459 and the housing 40 are in close contact with each other by adhesion, metal joining, screwing, or other methods. By coupling the third member 459 to the housing 40, the heat transmitted to the third member 459 can be further dissipated to the housing 40 side. Accordingly, heat staying in the third member 459 is suppressed and heat transfer to the second member 458 is suppressed. As a result, the deformation of the first member 457 can be more effectively suppressed.

The electromagnetic coil 456 illustrated in FIG. 7 includes a winding 4562, a first magnetic core 4564 inserted into the winding 4562, and a second magnetic core 4566 that supports the first magnetic core 4564. The second magnetic core 4566 has a plate shape and is disposed on the surface of the third member 459 in the +Z axis direction. In addition, the first magnetic core 4564 has a cylindrical shape and is coupled to the second magnetic core 4566.

An alternating current and a direct current are applied to the winding 4562 from the control portion 48 via a wiring (not illustrated). Further, the first magnetic core 4564 and the second magnetic core 4566 are cores for adjusting the magnetic path, respectively. By providing the first magnetic core 4564 and the second magnetic core 4566 as described above, the magnetic path is adjusted, and the torque for swinging the mirror 451 can be increased. Therefore, the power consumption of the electromagnetic coil 456 can be reduced.

Further, since the second magnetic core 4566 is coupled to the third member 459, the heat generated in the winding 4562 is likely to be transmitted to the third member 459 side. As a result, the temperature increase of the electromagnetic coil 456 can be further alleviated.

Examples of the configuration material of the first magnetic core 4564 and the configuration material of the second magnetic core 4566 include various soft ferrite materials, such as Mn—Zn ferrite and Ni—Zn ferrite, respectively.

As described above, the three-dimensional measuring apparatus 4 according to the embodiment is an apparatus that performs the three-dimensional measurement of the object W using the laser light L, and includes: the projection portion 41 including the optical scanning portion 45 which is an optical scanner that projects the pattern light PL using the laser light L onto the region including the object W; the imaging portion 47 that acquires the image data by capturing the image of the region including the object W irradiated with the laser light L; the control portion 48 that controls the driving of the projection portion 41 and the imaging portion 47; and the measuring portion 49 that performs the three-dimensional measurement of the region including the object W based on the image data. In addition, the optical scanning portion 45 includes: the reflection surface 450 that reflects light; the mirror 451 including the back surface 451a (first back surface) positioned at the side opposite to the reflection surface 450; the permanent magnet 455 disposed on the back surface 451a of the mirror 451; the support portion 452 that supports the mirror 451 and has the back surface 452a (second back surface) positioned at the same side as the back surface 451a (first back surface); the shaft portions 453 and 453 that couple the mirror 451 and the support portion 452 to each other and enable the mirror 451 to swing around the swing axis J; the first member 457 disposed on the back surface 452a (second back surface) of the support portion 452; the second member 458 that supports the first member 457 in a cantilever manner in the direction orthogonal to the swing axis J and along the back surface 452a (second back surface); the third member 459 that is disposed to face the first member 457 via the second member 458 and coupled to the second member 458; and the electromagnetic coil 456 disposed between the first member 457 and the third member 459.

In the optical scanning portion 45 of the three-dimensional measuring apparatus 4, the second member 458 supports the first member 457 in a cantilever manner, and the support direction intersects the swing axis J. Therefore, even when the warpage is generated in the first member 457 due to the generation of a thermal stress, a positional shift in the drawing of the pattern light PL due to the warpage can be corrected by adjusting the swing angle of the mirror 451. Therefore, even when the temperature change occurs in the optical scanning portion 45, it is possible to realize the optical scanning portion 45 with high accuracy of the light scanning position by the reflection surface 450. As a result, it is possible to realize the three-dimensional measuring apparatus 4 with high three-dimensional measurement accuracy.

In addition, the robot system 1 according to the embodiment includes the robot 2 provided with the robot arm 22, the three-dimensional measuring apparatus 4 that is installed in the robot arm 22 and performs the three-dimensional measurement of the object W using the laser light L, and the robot control device 5 that controls the driving of the robot 2 based on the measurement result of the three-dimensional measuring apparatus 4.

In the robot system 1, as described above, the accuracy of the three-dimensional measurement in the three-dimensional measuring apparatus 4 is high. Therefore, since the three-dimensional information of the object W can be grasped more accurately, the accuracy of various operations performed by the robot 2 with respect to the object W can be improved.

6. Stress Analysis

Table 1 below shows the result of acquiring the movement amount of the center of the reflection surface 450 and the angle of inclination of the reflection surface 450 by stress analysis and comparing the acquired result, when the temperature of the optical scanning portion 45 changes regarding two models with different configuration materials of the second member 458 of the optical scanning portion 45 illustrated in FIG. 7.

In a first model of the optical scanning portion 45, the configuration material of the mirror 451 and the configuration material of the support portion 452 are both silicon, the configuration material of the first member 457 is Tempax glass (registered trademark), and the configuration material of the second member 458 and the configuration material of the third member 459 are both aluminum. In the first model, the interface between the support portion 452 and the first member 457 and the interface between the first member 457 and the second member 458 are joined to each other with an adhesive, and the interface between the second member 458 and the third member 459 is integrally formed.

A second model of the optical scanning portion 45 is the same as the first model except that the second member 458 and the third member 459 are separate from each other, the configuration material of the second member 458 is Tempax glass (registered trademark), and the configuration material of the third member 459 is aluminum. In the second model, the interface between the second member 458 and the third member 459 is joined to each other with an adhesive.

For the two models, the behavior when the temperature increases from 5° C. to 60° C. was calculated by finite element method (FEM) analysis.

TABLE 1

| | | First model (Second member is made of aluminum) | Second model (Second member is made of glass) |
|---|---|---|---|
| Movement amount of center of reflection surface [μm] | X axis direction | 0 | 0 |
| | Y axis direction | −3 | 0 |
| | Z axis direction | 15 | 1 |
| Angle of inclination of reflection surface [°] | | 0.12 | −0.02 |

As a result, as illustrated in Table 1, it has become clear that, in the second model adopting the glass material as the configuration material of the second member 458, the movement amount of the center of the reflection surface 450 and the angle of the inclination of the reflection surface 450 are respectively suppressed small even when the temperature changes, compared to the first model adopting aluminum. The results indicate that the thermal conductivity of the third member 459 is preferably greater than the thermal conductivity of the second member 458, the thermal expansion coefficient of the first member 457 is preferably the same as the thermal expansion coefficient of the second member 458, and each of the configuration material of the first member 457 and the configuration material of the second member 458 is preferably a glass material.

Second Embodiment

Next, an optical scanning portion 45A that is an optical scanner according to a second embodiment will be described.

Figure 11:
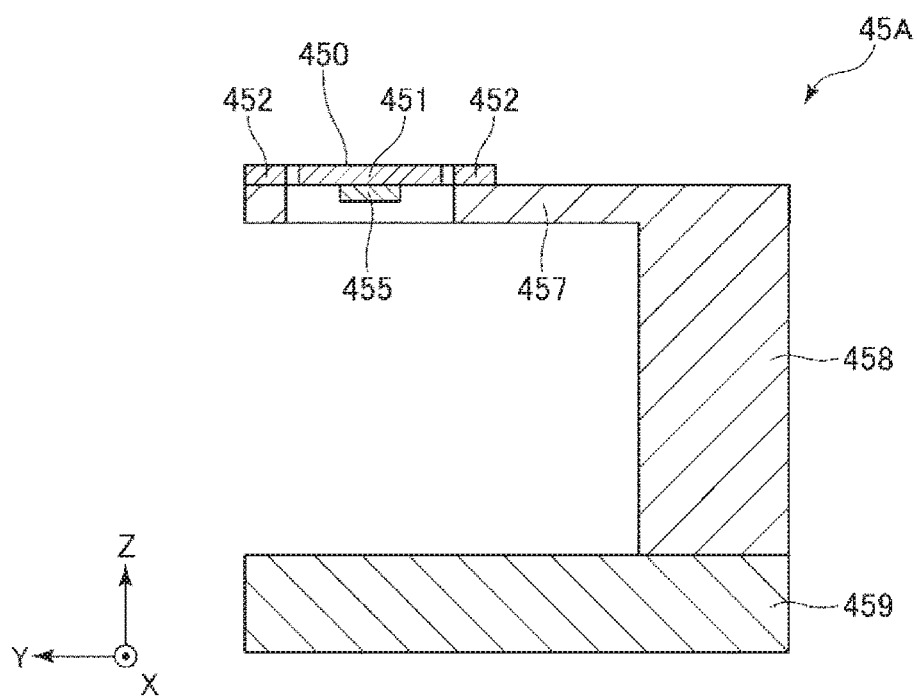
FIG. 11 is a sectional view illustrating an optical scanning portion that is an optical scanner according to a second embodiment.

FIG. 11 is a sectional view illustrating the optical scanning portion 45A that is an optical scanner according to the second embodiment.

Hereinafter, the second embodiment will be described, but in the following description, differences from the first embodiment will be mainly described, and descriptions of the same contents will be omitted. In addition, in FIG. 11, some parts of the configuration will be omitted.

The optical scanning portion 45A illustrated in FIG. 11 is the same as that of the first embodiment except that the first member 457 and the second member 458 are integrated with each other.

Specifically, in the optical scanning portion 45 according to the first embodiment, the first member 457 and the second member 458 are separate from each other, but are integrated with each other in the embodiment. According to such a configuration, there is no boundary surface between the first member 457 and the second member 458. Therefore, the adhesion stress which is likely to be generated on the boundary surface between the members can be eliminated, and the deformation of the first member 457 can be suppressed more reliably. As a result, the pattern light PL can be projected onto the intended position, and the accuracy of the three-dimensional measurement can further increase. Further, since the adhering process between the first member 457 and the second member 458 is not necessary, the number of assembling steps of the optical scanning portion 45A can be reduced.

In the second embodiment as described above, the same effect as that in the first embodiment can be obtained.

Above, the optical scanner, the three-dimensional measuring apparatus, and the robot system according to the disclosure have been described based on the illustrated embodiments, but the disclosure is not limited thereto, and the configurations of each part can be replaced with any configuration having similar functions. In addition, any other configurations may be added to the disclosure.

The optical scanner according to the disclosure may also be used for applications other than the three-dimensional measuring apparatus, for example, an image display device, such as a head-mounted display, a head-up display, and a projector.

What is claimed is:

1. An optical scanner comprising:
a mirror having a reflection surface for reflecting light, and a first back surface positioned at a side opposite to the reflection surface;
a permanent magnet disposed at the first back surface of the mirror;
a support portion that supports the mirror and has a second back surface positioned at the same side as the first back surface;
a shaft portion that couples the mirror and the support portion to each other and enables the mirror to swing around a swing axis;
a first member disposed at the second back surface of the support portion;
a second member that supports the first member in a cantilever manner in a direction orthogonal to the swing axis and along the second back surface;
a third member disposed to face the first member via the second member and coupled to the second member; and
an electromagnetic coil disposed between the first member and the third member.

2. The optical scanner according to claim 1, wherein a support surface that supports the first member by the second member is shifted from the shaft portion when viewed in plan view from a perpendicular direction of the reflection surface.

3. The optical scanner according to claim 1, wherein the electromagnetic coil includes a magnetic core.

4. The optical scanner according to claim 3, wherein the magnetic core is coupled to the third member.

5. The optical scanner according to claim 1, wherein
a thermal conductivity of the third member is larger than a thermal conductivity of the second member.

6. The optical scanner according to claim 1, wherein
the thermal expansion coefficient of the first member is the same as a thermal expansion coefficient of the second member.

7. The optical scanner according to claim 6, wherein
the first member and the second member are integrated with each other.

8. The optical scanner according to claim 6, wherein
a configuration material of the first member and a configuration material of the second member are glass materials.

9. The optical scanner according to claim 6, wherein
the thermal expansion coefficient of the first member is the same as a thermal expansion coefficient of the support portion.

10. The optical scanner according to claim 6, wherein
the thermal expansion coefficient of the first member is the same as a thermal expansion coefficient of the shaft portion.

11. The optical scanner according to claim 6, wherein
the thermal expansion coefficient of the first member is the same as a thermal expansion coefficient of the mirror.

12. A three-dimensional measuring apparatus that performs three-dimensional measurement of an object using laser light, the apparatus comprising:
   a projection portion including an optical scanner that projects pattern light by the laser light onto a region including the object;
   an imaging portion that acquires image data by capturing an image of the region including the object irradiated with the laser light; and
   a measuring portion that performs the three-dimensional measurement of the region including the object based on the image data, wherein
   the optical scanner includes
      a mirror having a reflection surface for reflecting light, and a first back surface positioned at a side opposite to the reflection surface,
      a permanent magnet disposed at the first back surface of the mirror,
      a support portion that supports the mirror and has a second back surface positioned at the same side as the first back surface,
      a shaft portion that couples the mirror and the support portion to each other and enables the mirror to swing around a swing axis,
      a first member disposed at the second back surface of the support portion,
      a second member that supports the first member in a cantilever manner in a direction orthogonal to the swing axis and along the second back surface,
      a third member disposed to face the first member via the second member and coupled to the second member, and
      an electromagnetic coil disposed between the first member and the third member.

13. The three-dimensional measuring apparatus according to claim 12, comprising:
   a housing that accommodates the projection portion, wherein
   the third member of the optical scanner is coupled to the housing.

14. A robot system including a robot having a robot arm, a three-dimensional measuring apparatus that is installed in the robot arm and performs three-dimensional measurement of an object using laser light, and a robot control device that controls driving of the robot based on a measurement result of the three-dimensional measuring apparatus, wherein
   the three-dimensional measuring apparatus includes
      a projection portion including an optical scanner that projects pattern light by the laser light onto a region including the object,
      an imaging portion that acquires image data by capturing an image of the region including the object irradiated with the laser light, and
      a measuring portion that performs the three-dimensional measurement of the region including the object based on the image data,
   the optical scanner includes
      a mirror having a reflection surface for reflecting light, and a first back surface positioned at a side opposite to the reflection surface,
      a permanent magnet disposed at the first back surface of the mirror,
      a support portion that supports the mirror and has a second back surface positioned at the same side as the first back surface,
      a shaft portion that couples the mirror and the support portion to each other and enables the mirror to swing around a swing axis,
      a first member disposed at the second back surface of the support portion,
      a second member that supports the first member in a cantilever manner in a direction orthogonal to the swing axis and along the second back surface,
      a third member disposed to face the first member via the second member and coupled to the second member, and
      an electromagnetic coil disposed between the first member and the third member.

* * * * *